United States Patent [19]
Davies et al.

[11] Patent Number: 5,849,652
[45] Date of Patent: Dec. 15, 1998

[54] METAL CONTAINING CATALYSTS AND METHODS FOR MAKING SAME

[75] Inventors: Geoffrey Davies, Lexington; Tarek M. Abdel-Fattah, Revere, both of Mass.; Kenneth J. Balkus, Jr., The Colony, Tex.

[73] Assignee: Northeastern University, Boston, Mass.

[21] Appl. No.: 722,524

[22] Filed: Sep. 27, 1996

Related U.S. Application Data

[63] Continuation of Ser. No. 212,888, Mar. 14, 1994, abandoned.

[51] Int. Cl.⁶ .............................. B01J 29/64; B01J 29/72
[52] U.S. Cl. ................................ 502/60; 502/66; 502/73; 502/74
[58] Field of Search ................... 423/212, 213.5, 423/213.2, 213.7; 506/66, 74, 331, 337, 60, 73

[56] References Cited

U.S. PATENT DOCUMENTS

| | | | |
|---|---|---|---|
| 3,617,518 | 11/1971 | Sinfelt et al. | 502/331 |
| 3,764,520 | 10/1973 | Kimberlin et al. | 208/11 |
| 3,853,787 | 12/1974 | Potts et al. | 252/455 |
| 3,876,522 | 4/1975 | Campbell et al. | 208/58 |
| 3,933,883 | 1/1976 | Parthasarathy | 502/335 |
| 4,118,434 | 10/1978 | Murtha et al. | 260/668 |
| 4,284,531 | 8/1981 | Simpson et al. | 502/74 |
| 4,307,250 | 12/1981 | Peterson et al. | 564/445 |
| 4,347,164 | 8/1982 | Scherzer | 423/112 |
| 4,375,002 | 2/1983 | Peterson et al. | 564/445 |
| 4,459,419 | 7/1984 | Seemuth | 549/429 |
| 4,478,757 | 10/1984 | Kervennal et al. | 560/342 |
| 4,552,855 | 11/1985 | Ozin et al. | 502/74 |
| 4,554,262 | 11/1985 | Dessau | 502/62 |
| 4,605,751 | 8/1986 | Curtis et al. | 502/152 |
| 4,615,997 | 10/1986 | Chen et al. | 502/66 |
| 4,666,874 | 5/1987 | Dessau | 502/62 |
| 4,694,114 | 9/1987 | Chu et al. | 585/481 |
| 4,704,495 | 11/1987 | Dessau | 585/481 |
| 4,743,572 | 5/1988 | Angevine et al. | 502/64 |
| 4,814,306 | 3/1989 | Von Ballmoos et al. | 502/62 |
| 4,837,397 | 6/1989 | Absil et al. | 502/66 |
| 4,840,929 | 6/1989 | Chen et al. | 502/74 |
| 4,874,504 | 10/1989 | Von Ballmoos et al. | 208/11 |
| 4,897,178 | 1/1990 | Best et al. | 208/111 |
| 4,906,800 | 3/1990 | Henry et al. | 585/260 |
| 4,912,072 | 3/1990 | Mallour et al. | 502/66 |
| 4,923,836 | 5/1990 | Kokayeff et al. | 502/331 |
| 4,933,003 | 6/1990 | Marzik et al. | 75/362 |
| 4,977,117 | 12/1990 | Berrebi et al. | 502/26 |
| 4,992,401 | 2/1991 | Schweizer | 502/66 |
| 5,061,313 | 10/1991 | Davies et al. | 75/362 |
| 5,141,909 | 8/1992 | Bezman | 502/66 |
| 5,166,370 | 11/1992 | Liotta, Jr. et al. | 549/509 |
| 5,202,014 | 4/1993 | Zones et al. | 208/46 |

OTHER PUBLICATIONS

Bein, T. "Reactivity of trimethyltin manganese pentacarbonyl in zeolite cavities", J. of physical chemistry, 1992, vol. 96, pp. 9447–9456.

Marzik et al., "Cu–Ni Alloy Formation by Reduction in Hydrogen of a polyheterometallic Complex", Chapman and Hall Ltd., 1988, pp. 833–835.

Davies et al., "Single–Phase $Cu_{0.50}Ni_{0.50}$ Alloy Preparation By Thermolysis of a Simple Heteropolymetallic Precursor", Elsevier Science Publishers, Apr. 1990, vol. 9:231–234.

El–Toukhy et al., "Transmetalation Reactions of Tetranuclear Copper (II) Complexes . . . ", J. Am. Chem. Soc., 1984, vol. 106:4596–4605.

(List continued on next page.)

Primary Examiner—Michael Lewis
Assistant Examiner—Peter Dimauro
Attorney, Agent, or Firm—Weingarten, Schurgin, Gagnebin & Hayes LLP

[57] ABSTRACT

The invention features metal-containing catalysts including a crystalline microporous metal oxide structure encapsulating an amount of metal which reflects the amount of metal introduced into the metal oxide structure.

6 Claims, 4 Drawing Sheets

OTHER PUBLICATIONS

Abu–Raqabah et al., "Limits of Direct Transmetalation of Polynuclear Copper (II) Complexes with $M(NS)_n$ Reagents . . ", Inorg. Chem., 1989, vol. 28:1156–1166.

Anderson et al., "A Magnetic Resonance Study of the Inclusion Compounds of Sodium in Zeolites: . . . ", American Chemical Society, 1992, vol. 114:10608–10618.

Walton, John C., "Bridgehead Radicals", Chemical Society Reviews, 1992, pp. 105–112.

Sachtler, Wolfgang M.H., "Metal Clusters in Zeolites: An intriguing Class of Catalysts", American Chemical Society, 1993, vol. 26:383–387.

METAL CONTAINING CATALYSTS AND METHODS FOR MAKING SAME

This application is a continuation of application Ser. No. 08/212,888, filed Mar. 14, 1994 now abandoned.

The invention described herein may be manufactured, used, and licensed by or for the U.S. Government for Governmental purposes without the payment to us of any royalty thereon.

FIELD OF THE INVENTION

The invention relates to the preparation of compositionally and morphologically uniform encapsulated metal catalysts of chemical reactions.

BACKGROUND OF THE INVENTION

Metal alloys such as copper-nickel (Cu—Ni), are well established as catalysts for a number of chemical processes. In hydrogenation reactions, alloy composition is known significantly to affect both catalyst activity and selectivity.

Cu—Ni catalysts can be prepared by a number of standard metallurgical and powder metallurgical techniques. Alloy formation in the Cu—Ni system is an endothermic process and alloys tend to exhibit compositional inhomogeneities in the form of local regions of relatively pure copper and pure nickel. A long careful annealing treatment is generally required to reach equilibrium and obtain single-phase homogeneous alloys. Techniques that tend to minimize inhomogeneities and increase catalyst activity and selectivity with a minimum of processing are therefore of great interest.

In any catalyst, a high surface area is generally desirable and usually leads to high catalyst activity. Low temperature decomposition of inorganic or organometallic precursors is a potential route to high surface area alloys. A typical bulk metal catalyst has a surface area on the order of 2 $m^2/gm$. Because of the endothermic nature of the Cu—Ni system, formation of homogeneous single-phase Cu—Ni catalysts may present a problem.

Supported metal catalysts are often employed to increase the active metal surface area and enhance catalyst activity. Metal oxides, especially alumina, are commonly used as catalyst supports. Catalytic activity may be enhanced at the surface or within the body of the catalyst support.

Prior art methods of preparing supported metal-based catalysts include ion-exchange metal loading techniques employing acidity control, reduction to metals with olefins, loading of different metals by ion-exchange in one or more steps, and inducement of chirality. There is a need in the art for methods of making metal-based catalysts whereby loading of one or more different metal atoms in or on a support can be tightly controlled to produce controlled metal distribution in the resultant catalyst.

SUMMARY OF THE INVENTION

The invention is based on the discovery that metal distribution and mixed metal stoichiometry and distribution may be effectively controlled in the preparation of highly selective hydrogenation catalysts. Catalysts of the invention are composed of a microporous crystalline metal oxide sieve-like structure which, after dehydration, is an effective encapsulator of heterometals under aprotic conditions. As used herein, an "aprotic" solution refers to a solution containing solvent molecules that neither donate nor accept a proton, i.e., act as neither a Bronsted acid or a base.

According to the invention, a dehydrated zeolite is an effective encapsulator of different metal entities present in intact heteropolymetallic (HPM) complexes in aprotic solution. Subsequent drying and mild reduction or oxidation then produces a catalyst in which intrazeolite cavities contain the same relative proportions of metal atoms as are present in the HPM.

Catalysts of the invention comprise metals encapsulated in a crystalline microporous metal oxide. The microporous metal oxide preferably includes alumina, silica and mixtures thereof, e.g., an aluminosilicate (a sieve-like component). The crystalline microporous metal oxides employed in these catalysts can include one or more natural or synthetic zeolites or molecular sieves. Representative examples of particularly preferred zeolites are zeolite Y or zeolite X. Synthetic zeolites have been generally described in U.S. Pat. Nos. 2,882,244; 3,130,007; and 3,126,789, the disclosures of which are incorporated herein by reference.

The neutral reactants used to make HPM are highly soluble in aprotic solvents such as methylene chloride and the reactions are very rapid at room temperature in aprotic solvents. The HPM products are easily isolated by gel permeation chromatography.

Thus, the invention features a metal-containing catalyst comprising an aluminosilicate structure encapsulating a ratio of heterometals that reflects the ratio of heterometals in the heteropolymetallic complex or mixture of heteropolymetallic complexes used to make the catalyst. As used herein, "heterometals" refers to two or more, e.g., four, and even up to eight, different metal entities, a metal "entity" being a single metal atom or ion; "heteropolymetallic complex" refers to a unit of heterometals (e.g., each unit containing metal atoms W, X, Y, Z) including a carrier of the metal atoms, the carrier being capable, under aprotic conditions, of transferring all the metal entities together to the encapsulating structure. A "mixture" of heteropolymetallic complexes refers to two or more heteropolymetallic complexes or units that contain differing ratios of two or more different metal entities, or different metal entities altogether. For example, a "mixture" may include a first HPM unit containing metal entities W, X, Y, Z and also a second HPM unit containing metal entities A, B, C, D, and optionally third, fourth and fifth, etc., units containing metal entities W, W, X, X; A, X, B, Y; and B, D, Z, A, respectively. The ratios of different metal entities in the "mixture" will be determined by the relative amounts of HPM units added to the mixture, and the metal entity content of each HPM. The invention is not meant to be limited to a given ratio of selected metal entities, but may encompass any such ratio of known metal entities.

Preferably, the crystalline microporous metal oxide structure is an aluminosilicate structure that consists essentially of a zeolite. The heteropolymetallic complexes are carriers that co-transport four metal entities, preferably two or more of which are different metal entities. "Co-transport" refers to the ability of the carrier to carry and transfer the metal entities to the encapsulating structure. Preferably, a heteropolymetallic complex includes $(\mu_4\text{-O})L_4(M^1,M^2,M^3M^4)_4Cl_6$, wherein $(\mu_4\text{-O})$ is a central oxo group, L is a monodentate pyridine, $M^1,M^2,M^3$, and $M^4$ are the same or different metal entities, and Cl is chloride.

The invention also features a metal-containing catalyst comprising plural metal atoms or ions encapsulated in a crystalline microporous metal oxide channel- or cage-like structure, wherein the metal atoms or ions encapsulated in the structure are encapsulated in an amount that is the same as the amount of metal introduced into the microporous metal oxide cage-like structure. Thus, the catalyst may include one metallic element or plural metallic elements, where the amount of metal encapsulated in the metal oxide structure is the same as the amount of metal introduced into the structure.

Alternatively, the catalyst may include several different metallic elements and plural atoms of each type which are encapsulated in relative amounts that are the same as the relative amounts of metal entities introduced into the structure. The invention thus also features a metal-containing catalyst comprising plural metal atoms or ions encapsulated in a crystalline microporous metal oxide cage-like structure, wherein the encapsulated metal atoms or ions include at least two different metals which are encapsulated in relative amounts that are the same as the relative amounts of heterometals present in the HPM mixture used to make the catalyst.

Preferably, the HPM mixture used to make the catalyst comprises heteropolymetallic complexes that contain four metal entities and at least two different metal elements. Preferably, the complex is soluble in an aprotic solvent such as methylene chloride or nitrobenzene. The metal oxide channel- or cage-like structure may be an aluminosilicate structure such as a zeolite.

The invention also encompasses a metal-containing catalyst comprising a polymetallic complex encapsulated in a crystalline microporous metal oxide channel- or cage-like structure, wherein the encapsulated complex contains four or more metal entities and a carrier encapsulated within a channel or cavity of the crystalline microporous structure, the encapsulated metal entities being convertible to metal atoms or metal oxides at a temperature on the order of 350° C. or lower. Preferably, the temperature is 300° or lower; most preferably 250° or lower.

The invention thus encompasses the introduction of metals into a support structure. The metal entities are carried on a carrier, e.g., $(\mu_4\text{-O})L_4(M^1,M^2,M^3,M^4)_4Cl_6$, in the form of metal entities, $M^1, M^2, M^3, M^4$. Upon introduction of the metal/carrier complex into the support structure, the four L ligands of the carrier are lost from the complex, resulting in encapsulation of the L-depleted metal complex. The introduced metal complexes are then converted either to atoms by reduction or to metal oxides by treatment with oxygen. Thus, metal entities, i.e., atoms or ions, of varying oxidation states may be introduced into the support structure. These oxidation states may include but are not limited to the $6^+, 5^+, 4^+, 3^+, 2^+, 1^+$ or the neutral form.

The microporous crystalline structure comprises one or more channels of approximately equal size, or a central cavity surrounded by peripheral cavities, the cavities being connected by channels. Thus, the polymetallic or heterometallic complex is substantially embedded in the crystalline structure. However, in contrast to prior art metal catalysts, which generally require temperatures above 350° C. for conversion to a metal atom or metal oxide-containing structure, a metal catalyst of the invention is convertible to the atom or oxide form by exposure to a temperature of 350° C. or lower.

As used herein, "polymetallic complex" includes a metallic complex wherein the metal ions or atoms carried by the complex are the same metal, i.e., where $M^1, M^2, M^3$, and $M^4$ are all the same metal, and also includes a heterometallic complex, i.e., a complex including different metals, wherein at least two of $M^1, M^2, M^3$, and $M^4$ are different elements.

The invention also encompasses a method of preparing a multimetal-containing catalyst, the method including the steps of (a) combining a dehydrated aluminosilicate structure with a heteropolymetallic complex in an aprotic solution, (b) drying the loaded solid, and (c) reducing the solid product from step (b) to encapsulated metal atoms.

Alternatively, the invention encompasses a method of preparing a multimetal-containing catalyst comprising (a) combining a dehydrated crystalline microporous metal oxide structure with a heteropolymetallic complex in an aprotic solution, (b) drying the loaded solid, and (c) oxidizing the solid product from step (b) to give encapsulated metal oxides.

Preferably, the crystalline microporous metal oxide structure comprises an aluminosilicate such as a zeolite, and step (a) is performed at room temperature. Preferably, the reducing step (c) is performed using $H_2$, or the oxidizing step (c) is performed using $O_2$.

The invention also encompasses a method of selectively reducing an alkyne, comprising (a) providing a multimetal-containing catalyst comprising a zeolite encapsulating heterometals, wherein the heterometal entities are present in the encapsulating structure in metal ratios that reflect the ratios present in the HPM mixture used to make the catalyst; and (b) subjecting a compound comprising an alkyne to the catalyst under reducing conditions for a time sufficient to reduce the alkyne-containing compound to an alkene-containing compound.

Preferably, the HPM encapsulation is performed by exposing a dehydrated zeolite to a heteropolymetallic complex in an aprotic solvent and the heteropolymetal complex comprises four metal entities, at least two of which are different metals.

Metal-containing catalysts have many uses that include large-scale petroleum refining and petrochemical production. Supported metal catalysts have larger surface area and higher activity than bulk catalysts.

Catalysts of the invention appear to operate at higher levels of productivity in that they show a higher degree of activity and selectivity than the prior art catalysts. The process of making the compositions of the instant invention is simple and straight-forward and the compositions thus obtained should be less expensive than those of the prior art which utilize very complex steps in their preparation.

Other features and advantages of the invention will be apparent from the following description and claims.

BRIEF DESCRIPTION OF THE DRAWINGS

The invention will be more fully understood from the following exemplary detailed description taken in conjunction with the accompanying drawings in which.

DETAILED DESCRIPTION

Encapsulating structures useful in the catalysts of the invention are shape-selective materials, i.e., solid oxides with fixed pore dimensions. Such materials also have a Constraint Index within the range of about 1–12. Methods for determination of Constraint Index are well-known and are set out in the Journal of Catalysis 67, 218–222 (1981).

The silica/alumina mole ratio of useful aluminosilicates is greater than 1.0 and preferably ranges from about 2.5 to 100 and even up to infinity. Most preferably this ratio is about 2.5. These materials are typically the hydrated forms of crystalline siliceous zeolites containing varying quantities of alkali metal and aluminum with or without other metals.

Zeolites are crystalline aluminosilicate materials with an open framework having well-defined pore structures. The basic building block is a tetrahedron consisting of a central cation surrounded by four $O^{2-}$ ions. Each tetrahedron is linked to four other tetrahedrons, two adjacent tetrahedra sharing one $O^{2-}$ corner.

Representative zeolite molecular sieves useful according to the invention consist of a rigid three dimensional framework of $SiO_4$ or $MO_4$ units, where M is a Group III A metal, for example, aluminum or gallium, wherein the tetrahedra are cross-linked by the sharing of oxygen atoms such that the ratio of the total Group III A metal and silicon atoms to oxygen is 1:2. Molecular sieves may also contain other framework $MO_4$ groups, even to the exclusion of $SiO_2$, e.g., where M=Al, Ga, P, As, Ti, V, Cr, Fe, Mn, Co, or Zn. See R. Szostak, *Molecular Sieves*, Van Nostrand Reinhold, New York, 1989, hereby incorporated by reference. The electrovalence of the tetrahedra containing a Group IIIA metal is balanced by the inclusion in the crystal of a cation, for example, an alkali metal or an alkaline earth metal cation. This can be expressed wherein the ratio of metal M to the number of various cations, such as Ca/2, Sr/2, Na, K or Li is equal to unity. One type of cation may be exchanged either entirely or partially by another type of cation according to the methods of prior art.

In the case of aluminosilicate zeolites, the alkali metal, silicon, aluminum and oxygen atoms in the zeolites are arranged in the form of an aluminosilicate salt in a definite and consistent crystalline structure. The structure contains a large number of cavities interconnected by smaller pores or channels. These cavities and channels are uniform in size. The channel diameter sizes of the crystalline aluminosilicate can range from 2.5 to 15 Å and preferably from 5 to 8 Å.

The aluminosilicate component may comprise a sieve of one specific pore diameter size or, alternatively, mixtures of sieves of different cavity and pore diameter size. Thus, for example, mixtures of 5 Å and 13 Å sieves may be employed as the aluminosilicate component. Synthetic zeolites such as type-Y faujasites are preferred and are prepared by well-known methods such as those described in U.S. Pat. No. 3,130,007.

Prior art techniques have resulted in the formation of a great variety of synthetic zeolites. These zeolites have come to be designated by letter or other convenient symbols, as illustrated by zeolite X (U.S. Pat. No. 2,882,244) zeolite Y (U.S. Pat. No. 3,130,007), ZK-5 (U.S. Pat. No. 3,247,195) ZK-4 (U.S. Pat. No. 3,314,752), zeolite beta (U.S. Pat. No. 3,308,069), ZSM-5/ZSM-11 intermediate compositions (U.S. Pat. No. 4,229,424), ZSM-5 (U.S. Pat. No. 3,702,886), ZSM-11 (U.S. Pat. No. 3,709,979), ZSM-12 (U.S. Pat. No. 3,832,449), ZSM-23 (U.S. Pat. No. 4,076,842), ZSM-35 (U.S. Pat. No. 4,016,245), ZSM-38 (U.S. Pat. No. 4,046,859), and ZSM-48 (U.S. Pat. No. 4,375,573), merely to name a few. All of the above patents are incorporated herein by reference.

Zeolites have been used for separating gases, softening hard water, and as catalysts in the petroleum and chemical industries. Zeolites that are used in heterogeneous catalysis contain atoms of one or more transition element. Zeolites are useful as ion exchange agents because they contain mobile and thus exchangeable "guest" ions, e.g., $Na^+$, which compensate for a positive charge deficit. This ion exchange capability is evident in the use of zeolites in, e.g., detergents for softening hard water. Acid zeolite catalysts contain $NH_4^+$ ions instead of $Na^+$ ions, the $NH_4^+$ ions being converted by heat to protons. Acid zeolite catalysts are useful in industrial processes such as isomerization, cracking, and alkylation, and are used in the petroleum industry. Zeolite-based metal catalysts have been prepared by exchanging part of the original guest ions with ions of a desired metal, e.g., Pt. The desired metal ions may be introduced to the zeolite in complexed form, e.g., $Pt^-(NH_3)_4^{2+}$, via simple ion exchange. Reduction or oxidation converts the loaded materials to supported metals or metal oxides. A calcination step, i.e., exposure to heat and $O_2$, destroys the amines, leaving $Pt^{2+}$ ions which are treated with $H_2$ to yield $Pt^0$. Exchange of guest ions with more than one metal can be performed to obtain bi- or multimetal catalysts.

Zeolites useful in the present invention may encapsulate any of the following metals according to the invention; i.e., metals selected from the group consisting of Groups IB, IIB, IIIA, IIIB, IVA, IVB, VB, VIB, and VIIIB of the Periodic Table. Such metals include noble metals, e.g., ruthenium, rhodium, palladium, silver, osmium, iridium, platinum, and gold, or any suitable hydrogenation metal, e.g., a group VIIIB metal (Pt).

Catalyst selectivity is influenced by the molecular sieving properties of the catalyst, i.e., constraints for reactants, transition states, and products. Thus, only those molecules having a shape which allows them to enter the zeolite channels will reach active sites. When several products are formed simultaneously, those with the highest rate of diffusion will preferentially escape, while the remaining molecules may be trapped inside the zeolite or converted further.

Prior art methods of loading of metals into zeolites, e.g., ion exchange, produce variability in selectivity of resultant catalysts. For example, cations with high positive charge (e.g. $Ni^{2+}$) tend to occupy the zeolite channels rather than the larger cavities due to the higher negative charge density in the channels, thus restricting access to catalytic centers and lessening desirable shape-selective reactions in cavities. Agglomeration of metals due to metal migration within the zeolite framework or to the surface results in deactivation. This is particularly likely to occur at high reduction temperatures, i.e., above 350°–400° C. Some cations, e.g., $Ni^{2+}$, when introduced by ion exchange, require high temperatures to reduce them to metal atoms that result in metal atom agglomeration and catalyst deactivation.

Figure 1:
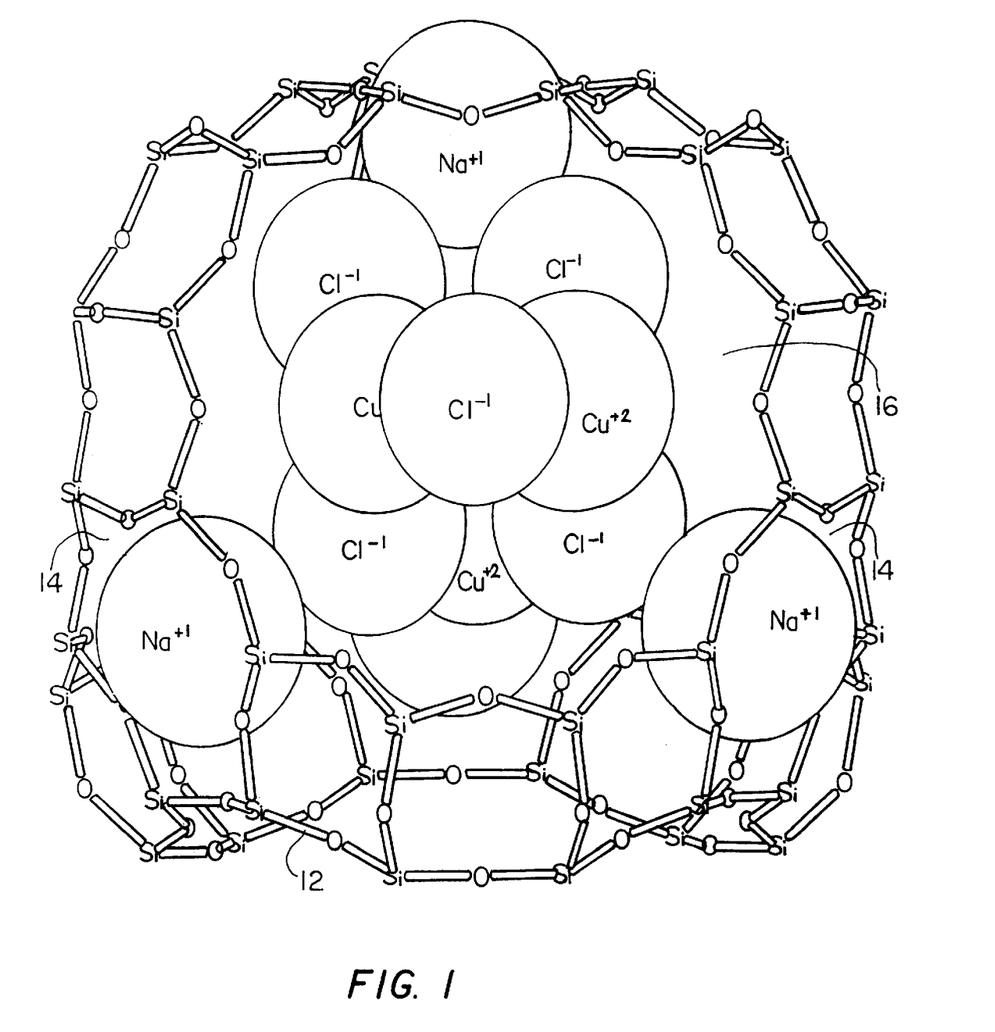
FIG. 1 is a diagram of the mM2 calculated arrangement of $(\mu_4\text{-O})Cu_4C_6$ encapsulated with four Na$^+$ cations in the 13Å diameter supercavity of Zeolite Na—Y, as viewed along the 7Å channel direction, and Cu$^{+2}$ and Cl$^{-1}$ ions in the center of the structure.

One example of a zeolite, Zeolite-Y, has 7 Å diameter channels containing 13 Å diameter supercavities, as shown in FIG. 1. The molecular sieving ability of the zeolite cage-like structure is apparent from the zeolite shown in FIG. 1; it is evident that some molecules will easily enter the zeolite channels, while others will be excluded. Although FIG. 1 represents zeolite, the structure shown in FIG. 1 is representative of a crystalline microporous metal oxide structure 12 that is a typical encapsulator according to the invention. The structure shown in FIG. 1 contains cavities 14 into which the $Na^{+1}$ ions are encapsulated, as well as a supercavity 16 into which the remainder of the $(\mu_4\text{-O})$ $Cu_4Cl_6$ carrier is encapsulated.

Zeolites can be made with different sized channels and cavities, at least 64 different networks having been identified by X-ray diffraction by 1986. The invention encompasses the use of any zeolite material having an open framework cage-like structure as a support for metal entities useful in catalytic reactions. A zeolite useful according to the invention will provide for shape-selective chemical conversion. Thus, zeolite-Y, described in detail herein, is only one example of a zeolite useful according to the invention. Other zeolites useful according to the invention will be useful in the sense that they allow for entry and retention of metal entities contained in a heteropolymetallic complex.

Previously, zeolite materials have been loaded with metals by simple ion exchange methods or mixed salt solution treatment. Conventional ion exchange in zeolites utilizes solutions containing metal salts. Incorporation of the metals into the zeolite structure produces variable results, depending upon the total metal ion concentration, relative proportions of different metals, pH, differing solubilities of the metals in solution, and differing affinities of different metals for zeolite. Because the metal distribution in ion exchange methods of making metal-containing zeolite catalysts is uncontrolled, the selectivity of the resultant catalysts is variable and largely unpredictable. Thus, subtle changes in preparation conditions have dramatic consequences on catalytic performance.

Metal catalysts made according to prior art methods are not predictable as to their selectivity. For example, bimetallic catalysts containing palladium and cobalt in zeolite-Y catalyze the conversion of synthesis gas to methane, higher hydrocarbons, methanol, and dimethyl ether. Results taken from Sachtler, 1993, *Acc. Chem. Res.* 26:383, illustrate selectivities of two catalysts containing the same quantities of Pd and Co (9 Pd and 9 Co atoms per unit cell of zeolite), both catalysts having been calcined and reduced at the same temperature. The only difference in treatment of the two catalysts is that one catalyst was reduced without delay, whereas the other catalyst tested was exposed to a moist atmosphere for several days prior to reduction. Comparison of the results shows that the catalyst selectivity is strikingly different, further emphasizing the unpredictable selectivity of mixed metal catalysts made by prior art methods. That is, oxygenates such as methanol and dimethyl ether prevail over the freshly reduced catalyst whereas production of hydrocarbons predominates over the other catalyst and oxygenates are negligible.

Encapsulating structures, e.g. zeolites, useful according to the invention encapsulate metal entities transferred from heteropolymetallic complexes in aprotic solution. A heteropolymetallic complex includes any molecule that contains at least two different metallic elements or, alternatively, three or four different metallic elements. An HPM complex may be made from a transmetalation target molecule that is capable of holding at least two, preferably at least four and perhaps eight, ten or twelve metal atoms. Examples of target molecules include but are not limited to monodentate pyridine-containing molecules, for example $(\mu_4\text{-O})L_4(M^1, M^2, M^3, M^4)_4Cl_6$, which is capable of holding a total of 4 metal (M) atoms.

An HPM complex is made by transmetalation of a transmetalation target using a transmetalator. Transmetalation is thus the stoichiometric replacement of the metals in a polymetallic target with other metals using reagents called transmetalators. A transmetalator is a source of metal atoms for exchange with metal atoms in a transmetalation target molecule.

Equation (1) illustrates a transmetalation reaction $$(\mu_4\text{-O})L_4Cu_4Cl_6 + xM(NS)_2 \rightarrow (\mu_4\text{-O})L_4Cu_{4-x}M_xCl_6 + xCu(NS)_2 \quad (1)$$

where L is a monodentate pyridine (e.g., N,N-diethylnicotinamide); M is Co, Ni or Zn; NS is a monoanionic S-methyl isopropylidenehydrazinecarbodithioate Schiff base ligand; and x is 1,2,3, or 4, where x is preselected. El-Toukhy et al. (1984, *Jour. Amer. Chem. Soc.* 106:4596–4605), hereby incorporated by reference, describes transmetalation reactions of tetranuclear copper (II) complexes using aprotic solvents. Other examples of HPM include any metal carrier which is able to enter the zeolite structure and deliver the carried metal entities to the internal structures of the zeolite.

Figure 2:
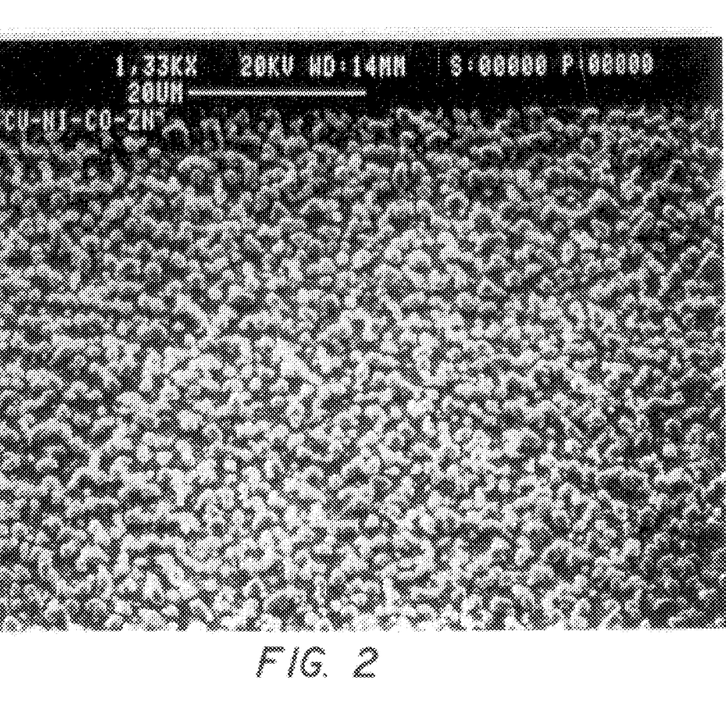
FIG. 2 is a scanning electron micrograph (SEM) of $(\mu_4\text{-O})L_4\text{CoNiCuZnCl}_6$ after having been reduced at 350° C. under $H_2$/Ar on quartz according to the invention.

The number of heteropolymetallic transmetalation products with L fixed may be varied by changing the metal at each reaction step. For example, in equation (1), where M may be Co, Ni or Zn, 32 different heteropolymetal products, i.e., a family of heteropolymetallic complexes, may be produced, one example of a heteropolymetallic complex being $(\mu_4\text{-O})L_4\text{CoNiCuZnCl}_6$, which contains four different metals. FIG. 2 is a scanning electron micrograph (SEM) of this heteropolymetal complex after having been reduced for 24 hours at 350° C. under $H_2$/Ar on quartz.

Figure 3:
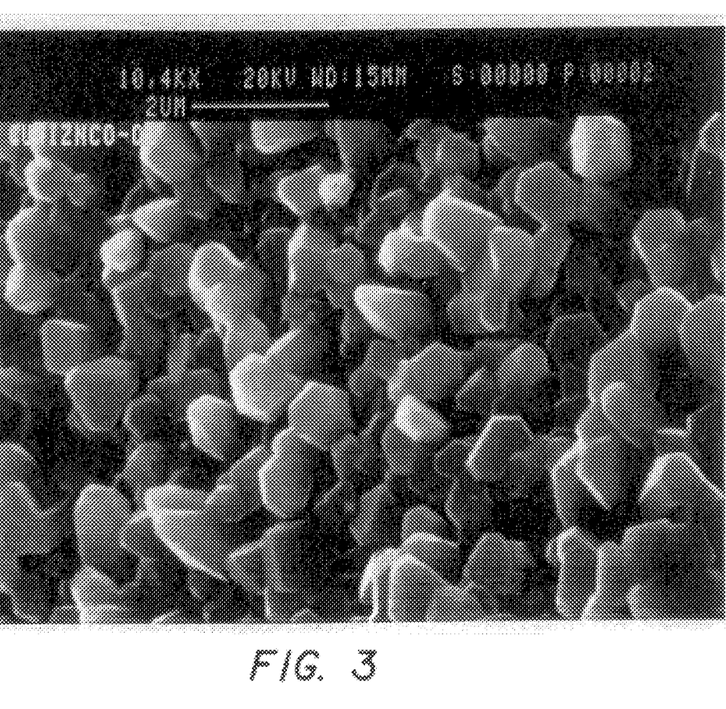
FIG. 3 is an SEM of $(\mu_4\text{-O})L_4\text{CoNiCuZnCl}_6$ oxidized under oxygen on quartz at 220° C. according to the invention.

Oxidized heteropolymetals may be produced using an $O_2$ thermolysis atmosphere at low temperatures. The catalytic properties of oxidized heteropolymetal complexes are often superior to oxides made using conventional methods. FIG. 3 is an SEM of $(\mu_4\text{-O})L_4\text{CoNiCuZnCl}_6$ oxidized under oxygen on quartz for 20 hours at 220° C. The individual crystals of $Co_3O_4$, NiO, CuO and ZnO evidently grew from a melt. The mixed metal oxide products disclosed herein are superior in stoichiometry, homogeneity and morphology to the products of thermolysis of mechanical mixtures of the carbonates of these same metals, which are incompletely decomposed to the oxides even at temperatures above 300° C.

Zeolite encapsulation of discrete heterometal molecules produces a metal-containing catalyst that has advantages over conventionally-loaded zeolite-based catalysts. Catalysts of the invention, i.e., zeolite encapsulating metal entities from heteropolymetallic molecules, are more predictable in their highly selective reactivity and provide for more controllable catalytic reactions.

Metal catalyst preparation methods of the invention do not depend upon ion exchange or incorporation of single metal atoms, but rely on zeolite encapsulation of discrete heteropolymetallic (HPM) complexes. Encapsulation is confirmed by extensive washing of the loaded zeolite with methylene chloride; if the metal atoms are encapsulated in the zeolite framework, then there will be no evidence of exchange of $Na^+$ in Na—Y zeolite upon washing.

According to the invention, a metal catalyst having the metal composition of the HPM complex used to make the metal catalyst may be prepared under controlled metal distribution conditions by encapsulation in zeolite of metal entities carried by the HPM complex. Large HPM complexes are small enough to pass through the zeolite channels to reach the zeolite cavities after losing the four L ligands in the encapsulation step. After drying and reduction or drying and oxidation, the metal content of the cavities reflects the metal content of the HPM complex. Thus, a highly selective polymetallic catalyst may be prepared according to the inventive methods based on the choice of metals contained within a given heteropolymetallic complex. In addition, a family of metal catalysts having varied metal compositions may be prepared according to the inventive methods based on encapsulation of a mixture of discrete HPM complexes.

Once a heteropolymetal encapsulated material has been made according to the invention, it may be characterized according to one or more the following techniques.

1. Lower surface area of material upon encapsulation.

Na—Y zeolite dehydrated for two hours at 400° C. had a surface area of 740 M² /gm, while a typical fully loaded zeolite had a surface area of 650 m² /gm. The lower surface area indicates metal encapsulation.

2. Indistinguishable Infra-Red (FT-IR) Spectra indicating absence of metal-carrying ligand.

The FT-IR spectra of the zeolite and fully loaded zeolite samples in the region 4000–400 cm$^{-1}$ were indistinguishable, confirming the absence of encapsulated ligand L.

3. Indistinguishable X-Ray Diffraction patterns indicating encapsulation of exceedingly small metal particles.

The X-ray powder patterns of the zeolite, loaded zeolites and totally reduced zeolite metal catalysts were indistinguishable, indicating that there is no metal migration to produce crystalline copper or nickel on the zeolite surface. The results indicate the encapsulation of nano-size metal particles.

4. X-Ray Photoelectron Spectra (XPS) to confirm metal encapsulation.

Metal contents from XPS measurements were very much less than the total metal contents indicated by inductively-coupled plasma spectroscopy. Since XPS is a surface analytical technique, these results confirm metal encapsulation.

5. Indistinguishable Scanning Electron Microscopy (SEM) indicating no metal atom migration.

SEM micrographs for zeolite, loaded zeolite and totally reduced zeolite samples were indistinguishable, confirming encapsulation with no metal atom migration.

6. Inductively-coupled Plasma Spectroscopy (ICP) Analysis.

The loading values (see Table II) obtained by inductively-coupled plasma spectroscopy indicate a $(\mu_4\text{-O})\text{Ni}_4\text{Cl}_6$ unit in one of the eight cavities of the unit cell of Na—Y zeolite.

Catalysts made by treatment of dehydrated Na—Y zeolite with heteropolymetallic transmetalation products are more selective than catalysts made by ion-exchange.

Catalysts made by treatment of dehydrated Na—Y zeolite with heteropolymetallic transmetalation products reduce 1,4-butynediol only to cis-1,4-butenediol, as indicated by a single product peak in the gc analysis. NMR measurements confirm that the sole product of reduction of 1,4-butynediol (BYD) by $H_2$ in the presence of a catalyst of the invention is cis-1,4-butenediol(cis-BED). In contrast, under the same conditions, bulk catalysts and catalysts made by ion-exchange give mixtures of 1,4-butenediol and 1,4-butanediol (BAD) identified by gc and NMR measurements.

The following examples are presented to illustrate the advantages of the present invention and to assist one of ordinary skill in making and using the same. These examples are not intended to limit the scope of the invention.

EXAMPLE I

Dehydrated Na—Y Zeolite Encapsulation of HPM.

Na—Y zeolite (Strem) was completely dehydrated by heating under high vacuum at 350° C. for 24 hr, as verified by thermogravimetric measurements. The dehydrated zeolite (1.00 gm) was titrated under dry nitrogen either with 1) an unseparated transmetalation product mixture consisting of a single heteropolymetallic molecule (containing particular fixed combinations of Co, Ni, Cu and Zn) together with co-product $Cu(NS)_2$ from the reaction shown in equation (1) above; or 2) with single heteropolymetallic products that had been separated from transmetalation co-product $Cu(NS)_2$ by gel permeation chromatography (El-Toukhy et al. 1984, *Jour. Amer. Chemical Society* 106:4596–4605). The solvent was anhydrous methylene chloride.

For each titration reaction, the zeolite sample was allowed to stand in the treatment solution at room temperature for 0.5 hr between each addition of titrant solution. After each 0.5 hr waiting period, the zeolite was separated from the treatment solution by centrifugation until the treatment solution from procedure 2) was just visibly colored, indicating a slight excess of heteropolymetallic titrant. With procedure 1) it was necessary to measure the electronic spectrum of the supernatant solution after each waiting period because co-product $Cu(NS)_2$ is not incorporated by the zeolite (see below).

After final centrifugal separation, each fully loaded zeolite sample was washed with methylene chloride until the washings were clear. Each fully loaded zeolite sample was dried under vacuum at room temperature in a rotary evaporator with a liquid nitrogen trap. The dried samples were analyzed by element-specific inductively-coupled plasma spectroscopy and by scanning electron microscopy (SEM), X-ray photoelectron spectroscopy (XPS), and X-ray fluorescence (EDAX) measurements.

The results demonstrated that co-product $Cu(NS)_2$ from reaction (1) in methylene chloride is not encapsulated by dehydrated Na—Y zeolite, as verified by control experiments with only $Cu(NS)_2$ in the treatment solution. This thermodynamically and kinetically stable co-product of equation (1) ($Cu(NS)_2$) is too large to pass through the zeolite channels and may be washed from the surface. Thus, it is unnecessary to separate the products of reactions (1) before treatment of the zeolite with a heteropolymetallic transmetalation product.

The N ligands of $(\mu_4\text{-O})L_4CU_{4-x}Ni_xCl_6$ are lost upon encapsulation, leaving $(\mu_4\text{-O})Cu_{4-x}Ni_xCl_6$ in the supercavities. Spectral measurements indicated that the ligands N of precursors $(\mu_4\text{-O})L_4(\text{Co, Ni, Cu, Zn})_4Cl_6$ are left behind in the treatment solution when $(\mu_4\text{-O})L_4(\text{Co, Ni, Cu, Zn})_4Cl_6$ are added to Na—Y zeolite in methylene chloride. This is consistent with the easy thermal removal of N from $(\mu_4\text{-O})L_4(\text{Co, Ni, Cu, Zn})_4Cl_6$ and leads to higher loading levels (the diameter of $(\mu_4\text{-O})Cu_4Cl_6$, i.e., N-ligand depleted carrier, is less than the 7Å diameter zeolite channel width). The L-free metal complexes are encapsulated rather than being physically adsorbed on the zeolite surface, because washing of loaded zeolite with methylene chloride does not result in loss of metal.

Figure 4:
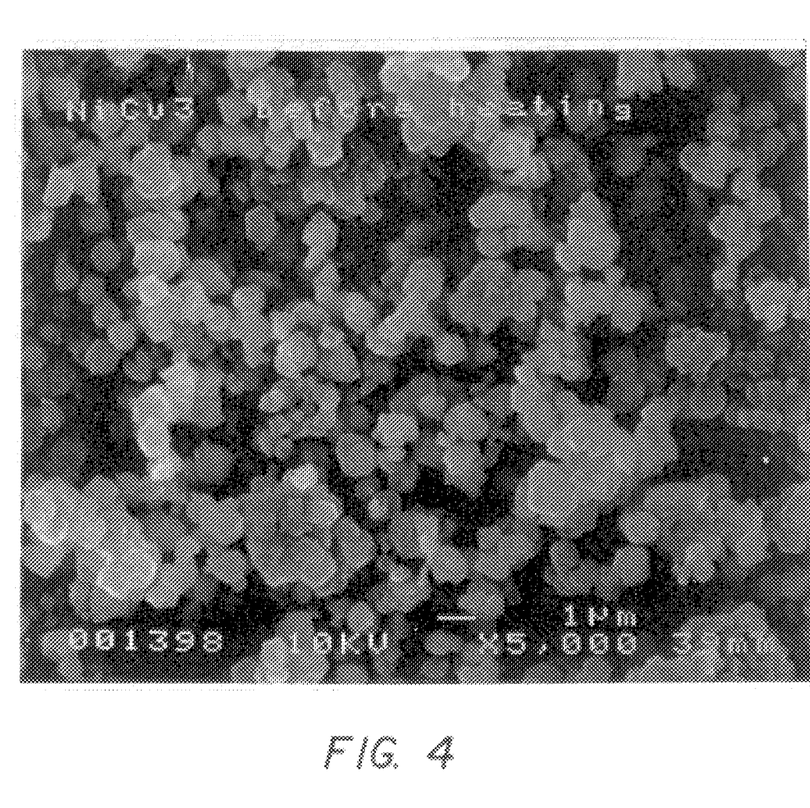
FIG. 4 is an SEM of a fully loaded Na—Y zeolite sample according to the invention.

The loading data (Table I) for dry, dehydrated Na—Y zeolite indicate maximum total metal capacities from 0.4 to about 1.6% by weight, with the highest values being for HPMs containing nickel. Proper zeolite loading of HPMs according to the invention will provide molar metal ratios in the loaded zeolite that are the same molar metal ratios as those of the HPMs with which the zeolites are loaded. FIG. 4 shows an SEM of a fully loaded zeolite sample. Heating such samples in hydrogen or oxygen readily converts the metals in the loaded zeolites to metal mixtures and mixed metal oxides, respectively.

TABLE I

Loading values for dry Na—Y zeolite in dry methylene chloride at 25° C.

| Precursor[a] | % Loading | % Metal Loaded[b] |
|---|---|---|
| $(\mu_4\text{-O})L_4Cu_4Cl_6$ | 2.1 | 0.46 |
| $(\mu_4\text{-O})L_4Cu_3NiH_2OCl_6$ | 3.3 | 0.69 |
| $(\mu_4\text{-O})L_4Cu_2(NiH_2O)_2Cl_6$ | 5.8 | 1.2 |
| $(\mu_4\text{-O})L_4Cu(NiH_2O)_3Cl_6$ | 7.8 | 1.6 |

TABLE I-continued

Loading values for dry Na—Y zeolite
in dry methylene chloride at 25° C.

| Precursor[a] | % Loading | % Metal Loaded[b] |
|---|---|---|
| ($\mu_4$-O)L$_4$Cu$_3$CoH$_2$OCl$_6$ | 1.9 | 0.40 |
| ($\mu_4$-O)L$_4$Cu$_2$Co$_2$Cl$_6$ | 2.4 | 0.49 |
| ($\mu_4$-O)L$_4$Co$_2$(ZnH$_2$O)$_2$Cl$_6$ | 2.4 | 0.49 |
| ($\mu_4$-O)L$_4$Co(NiH$_2$O)$_3$Cl$_6$ | 4.9 | 0.98 |
| ($\mu_4$-O)L$_4$Zn(NiH$_2$O)$_3$Cl$_6$ | 5.4 | 1.1 |

[a]Ligand L is N,N-diethylnicotinamide;
[b]Percent by weight assuming no encapsulation of L from any precursor.

EXAMPLE II

Described below is the characterization of highly selective mixed metal zeolite hydrogenation catalysts made from HPM transmetalation products.

Test tubes each containing 1.000 gm zeolite Na—Y (Strem, 1$\mu$ by SEM, vacuum-dehydrated to constant weight at 350° C.) in dry CH$_2$Cl$_2$ were treated with aliquots of 0.1M ($\mu_4$-O)L$_4$Cu$_4$Cl$_6$ in dry CH$_2$Cl$_2$ under N$_2$ at 25° C. The electronic spectra of the supernatants were examined periodically to ensure complete reaction. Invariant supernatant spectra were obtained within 24 hr at 25° C. in all cases. The minimum volume of treatment solution that generated an invariant detectable supernatant ($\mu_4$-O)L$_4$Cu$_4$Cl$_6$ spectrum (Abu-Raqabah et al., 1989, *Inorganic Chemistry* 28:1156, hereby incorporated by reference) was used to calculate mmol ($\mu_4$-O)L$_4$Cu$_4$Cl$_6$ consumed and hence the maximum percentage of metal loading. Spectra with excess titrant gave no evidence for decomposition of ($\mu_4$—O)L$_4$Cu$_{4-x}$(Ni(H$_2$O))$_x$Cl$_6$ ($\mu_4$—O)L$_4$Cu$_{4-x}$(Ni(H$_2$O))$_x$Cl$_6$ (x=1,2,3, or 4, isolated by gel permeation chromatography from reaction (1)). (Davies et al., 1992, *Chem. Soc. Rev.* 21:101; Abu-Raqabah et al., 1989, supra). Loading data and calculated metal contents of fully loaded zeolites were confirmed by inductively coupled plasma (ICP) measurements of HF-decomposed samples (Table II). In Table II, "Calc." designates the calculated metal content and "Obsd." designates the observed metal content. Calculation of metal content was performed as in the following example.

Titration data and no FTIR evidence for ligand L in loaded samples indicate that dry zeolite Na—Y encapsulates 5.8% w/w of ($\mu_4$—O)L$_4$Cu$_2$(Ni(H$_2$O))$_2$Cl$_6$ on treatment with ($\mu_4$—O)L$_4$Cu$_2$(Ni(H$_2$O))$_2$Cl$_6$ (Table II). This corresponds to 1.2% w/w total metal (equally divided between Ni and Cu) after reduction with H$_2$.

The observed metal content, i.e., %Ni and %Cu, was measured by ICP after standard sample treatment with aqueous HF: maximum analytical error is ±5% of quoted values (example: 0.18±0.01).

The "N" in each HPM ($\mu_4$—O)L$_4$Cu$_{4-x}$Ni$_x$Cl$_6$ molecule is N,N-diethylnicotinamide. An HPM coordinates one H$_2$O per Ni center during gel permeation chromatographic isolation. "M" indicates total metal content, which is the sum of the Ni and Cu columns.

TABLE II

Loading values (% w/w) for dry Na—Y zeolite
in dry methylene chloride at 25° C.

| | | Calc. | | | Obsd. | | |
|---|---|---|---|---|---|---|---|
| Precursor | Loading | Ni | Cu | M | Ni | Cu | M |
| ($\mu_4$-O)L$_4$Cu$_4$Cl$_6$ | 2.1 | 0.0 | 0.46 | 0.46 | 0.0 | 0.48 | 0.48 |
| ($\mu_4$-O)L$_4$Cu$_3$Ni(H$_2$O)Cl$_6$ | 3.3 | 0.17 | 0.52 | 0.69 | 0.18 | 0.54 | 0.72 |
| ($\mu_4$-O)L$_4$Cu$_2$(Ni(H$_2$O))$_2$Cl$_6$ | 5.8 | 0.60 | 0.60 | 1.2 | 0.58 | 0.63 | 1.2 |
| ($\mu_4$-O)L$_4$Cu(Ni(H$_2$O))$_3$Cl$_6$ | 7.8 | 0.40 | 1.2 | 1.6 | 0.46 | 1.2 | 1.7 |
| ($\mu_4$-O)L$_4$(Ni(H$_2$O))$_4$Cl$_6$ | 8.2 | 1.7 | 0.0 | 1.7 | 1.7 | 0.0 | 1.7 |

No Na$^+$ was detected in any supernatant treatment solution, confirming that there is no exchange of copper or nickel for sodium in the reaction. ICP showed no metal loss on repeated washing of the loaded samples with dry CH$_2$Cl$_2$. Separate experiments show that removal of N from ($\mu_4$—O)L$_4$Cu$_{4-x}$(Ni(H$_2$O))$_x$Cl$_6$ at 50°–150° C. results in ($\mu_4$—O)Cu$_{4-x}$Ni$_x$Cl$_6$ products that are insoluble in CH2Cl$_2$. FTIR spectra (4000–400 cm$^{-1}$) of the washed, vacuum dried samples indicated the absence of ligand N (that is, zeolite incorporation of ($\mu_4$—O)Cu$_{4-x}$(Ni(H$_2$O))$_x$Cl$_6$ (maximum diameters 5.4±0.1 Å) that can pass through the 7 Å dia. Na—Y channels and fit with 4Na$^+$ ions in the 13 Å dia. zeolite cavities). Mm2 calculated molecular models indicate that ($\mu_4$—O)Cu$_{4-x}$Ni$_x$Cl$_6$ units fit with 4Na$^+$ ions in the 13 Å diameter zeolite Na—Y cavity (see FIG. 1). Reduction to Cu$_{4-x}$Ni$_x$ leaves enough cavity volume for one BYD and one H$_2$.

Each loaded zeolite sample was reduced with H$_2$ (1 atm) at 400° C. for 2 hr. Encapsulation of heteropolymetallic complexes within the zeolite framework rather than coating of the complexes on the zeolite surface is indicated by the exceedingly low copper and nickel contents on the zeolite surface (using XPS data for loaded and loaded/reduced samples) in comparison to total metal content in the loaded zeolite (Table II). X-ray powder diffraction data and-SEM micrographs of untreated, loaded and loaded/reduced samples were indistinguishable, which is consistent with no surface metal agglomeration or crystallization. The results indicate encapsulation of very small copper and nickel species.

Loading values (Tables I and II) and a decrease in zeolite surface area (see Barrett et al., 1951, *Jour. Amer. Chem. Soc.*

73:373) from 740±30 to 650±30 m² /gm after loading indicate that only one in 7–8 cavities of the zeolite unit cell is occupied by $(\mu_4$—O$)$Cu$_{4-x}$(Ni(H$_2$O))$_x$Cl$_6$. These data suggest an "onion" model for loaded Na—Y zeolite particles. That is, occupancy of outermost zeolite cavities by immobile $(\mu_4$—O$)$Cu$_{4-x}$(Ni(H$_2$O))$_x$Cl$_6$ blocks further encapsulation because the cavities are interconnected. Thus, only the outer 12–15% of the zeolite cavity volume is occupied.

Solid HPM in a loaded zeolite from reaction (1) (M=Ni) are easily reduced to the corresponding single-phase alloy (Marzik et al., 1988, Jour. Materials Science Letters 7:833; Davies et al. 1990, Materials Letters 9:231; U.S. Pat. Nos. 4,933,003 and 5,061,313, hereby incorporated by reference) or oxidized to the corresponding highly dispersed, uniform metal oxide mixture (Davies et al. 1992, Materials Research Society Symposium Proceedings 249:87, hereby incorporated by reference).

EXAMPLE III

Selective reduction and oxidation reactions catalyzed by the zeolite heterometal catalysts of the invention are exemplified as follows.

Selective catalytic reduction of alkynes to cis-alkenes is an industrially significant reaction that heretofore has been difficult to achieve. (See Rylander, 1979, *Catalytic Hydrogenation in Organic Synthesis*, Academic Press, NY, Chap. 2.) Partial reduction of 1,4-butynediol (BYD) gives 1,4-butenediols (BED) for insecticide and vitamin B$_6$ synthesis. Total reduction gives 1,4-butanediol (BAD) for tetrahydrofuran, engineering plastic and polyester manufacture.

Loaded and reduced Na—Y zeolite samples made by $(\mu_4$—O$)$Cu$_{4-x}$(Ni(H$_2$O))$_x$Cl$_6$ encapsulation catalyze the reduction of BYD by H$_2$. 100 mg of each catalyst was used to reduce a 1.5 mM solution of BYD in methanol with H$_2$ (4.2 atm) at 40, 45 or 50° C. for 24 hr. Comparison experiments were run with bulk catalysts (typically 25 mg) made by reduction of $(\mu_4$—O$)$L$_4$Cu$_{4-x}$(Ni(H2O))$_x$Cl$_6$ with H$_2$ (Marzik et al., 1988, supra; Davies et al. 1990, supra; U.S. Pat. Nos. 4,933,003 and 5,061,313) and with mixed metal catalysts made by cation exchange of Na—Y zeolite with aqueous NiCl$_2$/⁻CuCl$_2$ mixtures and H$_2$ reduction. Percentage conversions and amounts of reduction products (Table III) were measured by gas chromatography on Carbowax 20M at 180° C. with N$_2$ carrier (1.55 mL/min). The sole product with the Na—Y encapsulated catalysts was identified by gas chromatography, PMR (to identify the cis-BED product) and comparison with an authentic sample as cis-1,4-butenediol (cis-BED). Gas chromatographic analysis of the mixture from a typical unselective catalytic experiment indicated unreacted BYD, BED, BAD and internal standard 1,6-hexanediol. Only unreacted BYD, cis-BED and the standard were observed with encapsulated catalysts.

Na—Y zeolite catalysts of the invention made by $(\mu_4$-O$)$Cu$_{4-x}$(Ni(H$_2$O))$_x$Cl$_6$ encapsulation and H$_2$ reduction are highly selective (Table III). Treatment of Na—Y encapsulated $(\mu_4$-O$)$Cu$_{4-x}$(Ni(H$_2$O))$_x$Cl$_6$ with water before reduction results in "ion-exchange" behavior, i.e., a catalyst that is non-selective in terms of BYD reduction.

Figure 5:
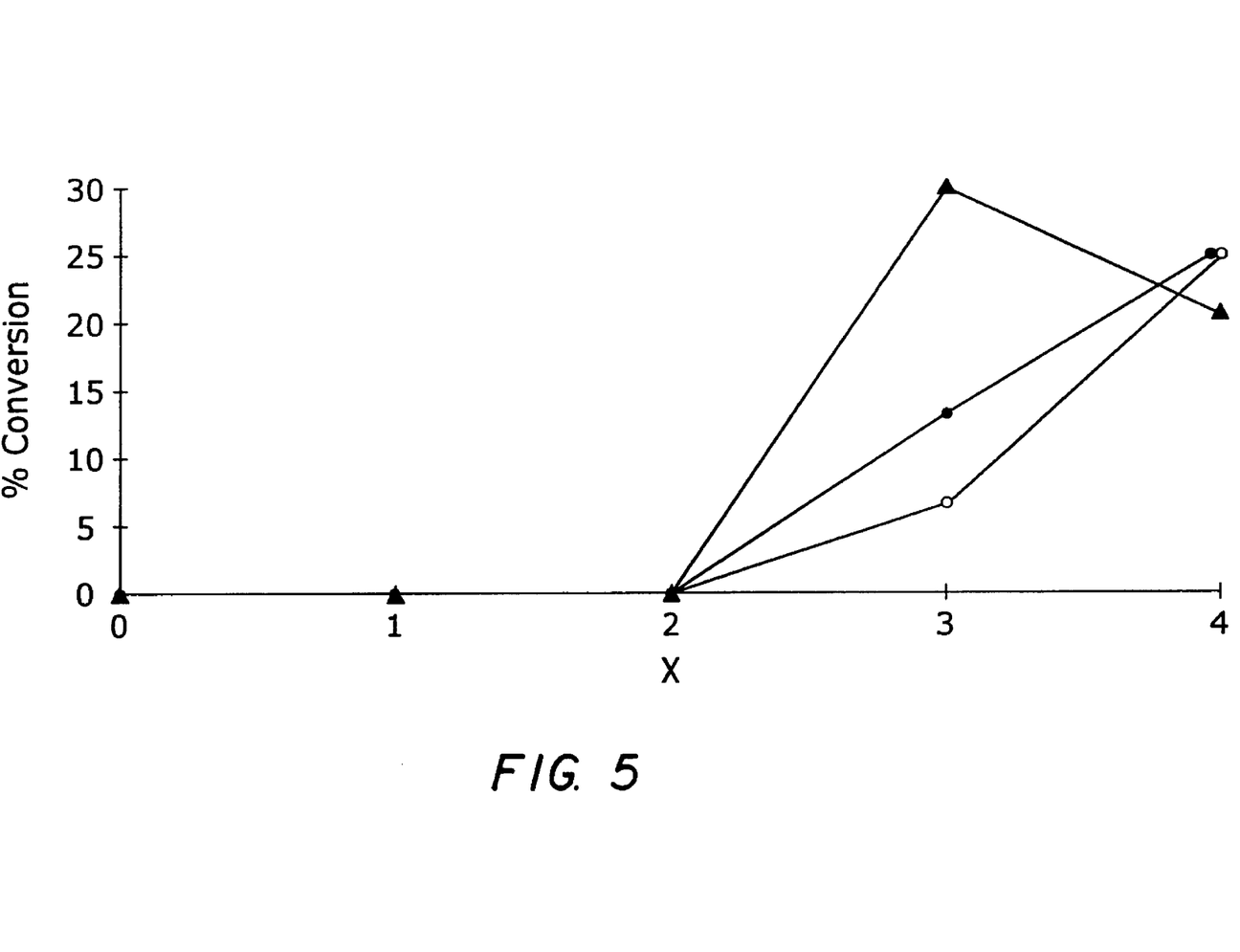
FIG. 5 is a graph which illustrates the relationship between catalytic reduction of BYD to cis-BED and the metal content of the metal-encapsulated zeolite catalysts of the invention.

FIG. 5 is a graph which illustrates the relationship between catalytic conversion of BYD to cis-BED and the metal content of the metal-encapsulated zeolite catalyst. In FIG. 5, conversion data for Na—Y encapsulated catalysts made from $(\mu_4$-O$)$L$_4$Cu$_{4-x}$(Ni(H$_2$O))$_4$Cl$_6$ are shown as a function of x. The conditions are as follows: 100 mg fully loaded/reduced catalyst, 1.5 mM BYD in methanol, 4.2 atm H$_2$ at 40° C. (O), 45° C. (●), 50° C. (▲). Percentage conversion was determined by gc analysis after 24 hr.

The results of FIG. 5 show very low catalytic activity for $(\mu_4$-O$)$L$_4$Cu$_{4-x}$(Ni(H$_2$O))$_x$Cl$_6$-derived catalysts when x=0, 1 and 2; temperature-independent activity when x=4; and maximum activity when x=3 at 50° C. The evidence suggests that a) Ni$_3$Cu and Ni$_4$ are discrete catalyst sites and b) catalysts made from $(\mu_4$-O$)$L$_4$Cu$_{4-x}$(Ni(H$_2$O))$_x$Cl$_6$ contain four metal atoms in the zeolite-Y cavity. A cavity containing three or four nickel atoms would naturally configure the triple bond of BYD with H$_2$ at the cavity center to favor selective reduction of BYD to cis-BED that binds weakly to Ni or Cu.

It will be apparent to those skilled in the art that other embodiments, improvements, details and uses can be made consistent with the letter and spirit of the foregoing disclosure and within the scope of the patent, which is limited only by the following claims, construed in accordance with patent law. Other embodiments are within the following claims.

TABLE III

Data for Catalytic Reduction of BYD (1.5 mM) by H$_2$ in Methanol

| | | | | Products[a] | | | |
|---|---|---|---|---|---|---|---|
| Expt | Metal | Time[b] | Temp[c] | BAD | cis-BED[d] | % Selectivity | % Conversion[f] |
| A. Encapsulated Catalysts from Transmetalation Products[g,h] | | | | | | | |
| 1 | Ni$_3$Cu | 24 | 40 | nd[i] | 0.11 | 100 | 8 |
| 2 | | 24 | 45 | nd | 0.19 | 100 | 13 |
| 3 | | 24 | 50 | nd | 0.38 | 100 | 26 |
| 4 | Ni$_4$ | 24 | 40 | nd | 0.38 | 100 | 25 |
| 5 | | 24 | 45 | nd | 0.37 | 100 | 25 |
| 6 | | 24 | 50 | nd | 0.32 | 100 | 21 |
| B. Bulk Catalysts (25 mg) from Transmetalation Products | | | | | | | |
| 7 | Ni$_3$Cu | 63 | 50 | 0.09 | 0.16 | 63 | 17 |
| 8 | Ni$_4$ | 24 | 50 | 0.09 | 0.17 | 92 | 17 |
| 9 | | 63 | 45 | 0.06 | 0.34 | 85 | 26 |
| C. Catalysts from Ion Exchange Method | | | | | | | |
| 10 | Ni | 24 | 40 | 0.13 | 0.58 | 83 | 47 |
| 11 | | 24 | 45 | 0.12 | 0.90 | 81 | 75 |

TABLE III-continued

Data for Catalytic Reduction of BYD (1.5 mM) by $H_2$ in Methanol

| Expt | Metal | Time[b] | Temp[c] | BAD | cis-BED[d] | % Selectivity | % Conversion[f] |
|---|---|---|---|---|---|---|---|
| 12 |  | 24 | 50 | 0.13 | 0.97 | 88 | 75 |
| 14 | NiCu[j] | 24 | 40 | 0.12 | 0.70 | 85 | 56 |
| 15 |  | 24 | 45 | 0.21 | 0.69 | 85 | 56 |
| 16 |  | 24 | 50 | 0.13 | 0.90 | 87 | 70 |

In Table III, [a]millimolar concentrations of products determined by gc analysis; [b]reaction time is in hours; [c]temperature is °C.; [d]cis-BED = cis-1,4-butenediol; [e]% selectivity = [(cis-BED/(BAD + cis-BED)] × 100; [f]% conversion = [(cis-BED + BAD)/(BYD)] × 100; [g]100 mg of catalyst unless indicated otherwise; [h]catalysts derived from $(\mu_4\text{-O})L_4Cu_{4-x}(Ni(H_2O))_xCl_{6(x\ =\ 0,\ 1,\ 2)}$ have very low catalytic activity (FIG. 5); [i]nd = below gc detection limit; [j]loaded at molar ratio Ni/Cu = 1 from 0.1M aqueous $NiCl_2/CuCl_2$ solution.

We claim:

1. A method of preparing a multimetal-containing catalyst comprising:

(a) combining a dehydrated aluminosilicate structure comprising a plurality of binding supercavities in an aprotic solvent with a solution of heteropolymetallic complexes comprising a carrier which is soluble in said aprotic solvent and which is bound to a plurality of metal atoms, wherein said heteropolymetallic complexes diffuse into said supercavities, and said carrier detaches from said plurality of metal atoms upon encapsulation of said plurality of metal atoms in said supercavities, so as to leave said plurality of metal atoms encapsulated in said supercavities to form a loaded solid, (b) washing said carrier from said loaded solid with said aprotic solvent, (c) drying said solid, and (d) chemically reducing said solid from step (c).

2. A method of preparing a multimetal-containing catalyst comprising:

(a) combining a dehydrated zeolite comprising a plurality of binding supercavities in an aprotic solvent with a solution of heteropolymetallic complexes comprising a carrier which is soluble in said aprotic solvent and which is bound to a plurality of metal atoms, wherein said heteropolymetallic complexes diffuse into said supercavities, and said carrier detaches from said plurality of metal atoms upon encapsulation of said plurality of metal atoms in said supercavities so as to leave said plurality of metal atoms encapsulated in said supercavities to form a loaded solid;

(b) washing said carrier from said loaded solid with said aprotic solvent;

(c) drying said solid, and (d) oxidizing said solid from step (c).

3. The method of claim 1, wherein said aluminosilicate structure comprises zeolite.

4. The method of claim 1 or 2, wherein step (a) is performed at room temperature.

5. The method of claim 1 wherein said reduction step (d) is performed using $H_2$.

6. The method of claim 2 wherein said oxidizing step (d) is performed using $O_2$.

* * * * *

UNITED STATES PATENT AND TRADEMARK OFFICE
CERTIFICATE OF CORRECTION

PATENT NO. : 5,849,652
DATED : December 15, 1998
INVENTOR(S) : Geoffrey Davies et al.

Page 1 of 1

It is certified that error appears in the above-identified patent and that said Letters Patent is hereby corrected as shown below:

Column 4,
Line 51, reads, "$C_6$" should read -- $Cl_6$ --.

Column 11,
Line 52, reads, "… $Cl_6(\mu_4…)$" should read -- … $Cl_6$ in contact with dry Na-Y zeolite, or for reaction with ligand-L, which is released upon encapsulation. The experiments were repeated with the other members of the family ($\mu_4$… --.

Column 12,
Line 42, reads, "CH2Cl$_2$" should read -- $CH_2Cl_2$ --.

Column 13,
Line 40, (inside formula), reads, ") $L_{4-x}$" should read --)$L_4Cu_{4-x}$ --.

Signed and Sealed this

Eighteenth Day of September, 2001

Attest:

NICHOLAS P. GODICI
*Attesting Officer*  *Acting Director of the United States Patent and Trademark Office*